(12) United States Patent
Nelsen et al.

(10) Patent No.: US 6,283,499 B1
(45) Date of Patent: Sep. 4, 2001

(54) AIRBAG DEVICE HAVING AN INNER FLEXIBLE HEAT SHIELD AND FLOW DIRECTION BAG

(75) Inventors: James M. Nelsen, Albuquerque; Kenneth W. Gwinn, Cedar Crest, both of NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/025,152

(22) Filed: Feb. 18, 1998

Related U.S. Application Data

(60) Provisional application No. 60/038,232, filed on Feb. 19, 1997.

(51) Int. Cl.[7] ........................................... B60R 21/24
(52) U.S. Cl. ............................. 280/729; 280/743.1
(58) Field of Search .................... 280/728.1, 729, 280/738, 743.1, 740

(56) References Cited

U.S. PATENT DOCUMENTS

| | | |
|---|---|---|
| 3,674,059 | 7/1972 | Stephenson . |
| 3,787,074 | 1/1974 | Lewis et al. . |
| 3,843,151 | 10/1974 | Lewis . |
| 3,900,210 | 8/1975 | Lohr et al. . |
| 5,172,933 | 12/1992 | Strasser . |
| 5,195,774 | 3/1993 | Morita . |
| 5,249,824 | * 10/1993 | Swann et al. ................ 280/729 |
| 5,358,273 | * 10/1994 | Onishi et al. ................ 280/743 |
| 5,482,317 | 1/1996 | Nelsen et al. . |
| 5,511,821 | * 4/1996 | Meyer et al. ................ 280/743.1 |
| 5,516,146 | * 5/1996 | Kopitzke ................ 280/728.2 |
| 5,577,765 | * 11/1996 | Takeda et al. ................ 280/729 |
| 5,687,986 | * 11/1997 | Nelsen et al. ................ 280/728.2 |
| 5,826,913 | * 10/1998 | Mramor ................ 280/728.2 |
| 5,860,672 | * 1/1999 | Petersen ................ 280/728.2 |
| 5,913,535 | * 6/1999 | Taguchi et al. ................ 280/729 |
| 5,941,559 | * 8/1999 | Rudolf et al. ................ 280/729 |

FOREIGN PATENT DOCUMENTS

| | | |
|---|---|---|
| 92 11 421 | 1/1993 | (DE) . |
| 42 39 035 A1 | 5/1993 | (DE) . |
| 0 496 566 A1 | 7/1992 | (EP) . |
| 2 109 477 | 5/1972 | (FR) . |

* cited by examiner

*Primary Examiner*—Lanna Mai
(74) *Attorney, Agent, or Firm*—V. Gerald Grafe; Stephen Kalinchak

(57) ABSTRACT

The present invention relates to an inflatable occupant restraint device having an inflator, an outer bag disposed around the inflator to allow the outer bag to be filled with gas produced by the inflator, an inner bag, disposed in between the outer bag and the inflator, wherein the inner bag is made of a flexible material having at least one flow outlet in the flexible material altering the flow of gas produced by the inflator. The inner bag protects the outer bag from hot gases and particles emanating from the inflator. The inner bag may also have a pattern of stitched seams forming gas flow outlets to impart a desired flow pattern to the inflating gases.

18 Claims, 5 Drawing Sheets

AIRBAG DEVICE HAVING AN INNER FLEXIBLE HEAT SHIELD AND FLOW DIRECTION BAG

This application claim benefit to Provisional application Ser. No. 60/038,232 and filing data Feb. 19, 1997.

FIELD OF THE INVENTION

The present invention relates to occupant restraint devices and systems for increasing the safety of moving vehicles. The present invention further relates to devices and systems using inflatable airbags for the safety of automobile occupants. More particularly, the invention relates to the use of an inner bag within the outer airbag and disposed between the outer airbag and gas supply means. The inner bag serves as a heat shield and also directs the flow of the inflating gas to selected portions of the airbag, protecting the airbag from hot gases and particulate matter originating from the gas supply means.

BACKGROUND OF THE INVENTION

Because of increased interest in automobile safety and passive restraint systems for the protection of the driver or passengers, inflatable airbag assemblies have become well known in the art. These inflatable airbag assemblies typically have a gas supply means and an airbag to which the gas is delivered. In the event of a collision, the gas supply means activates and inflates the airbag, thus providing a protective cushion for the vehicle's occupants. The inflated airbag, acting as a cushion, prevents or reduces injuries to the vehicle's occupants caused by violent contact with the inner surfaces of the vehicle.

These airbag systems often use a gas supply means containing gas producing substances. When the vehicle becomes involved in a collision of a predetermined magnitude, the gas producing substances are activated, often by burning, to rapidly inflate the airbag. Because of the rapid combustion, the produced inflating gases may reach temperatures of about 1100° F. or higher. These high temperature gases may be detrimental to the integrity of the airbag fabric. For example, the melt temperature of nylon is about 480° F. When nylon is used as the airbag fabric, then, the airbag may melt and thus lose function. Further, nylon loses strength at elevated temperatures. A temperature of 200° F., for example, reduces the high strain rate breaking strength of nylon by about 25 percent. Accordingly, the high temperature gases used to inflate conventional airbag systems present significant risks of airbag failure.

It is therefore known in the art to provide a type of heat shield in proximity to the gas supply means. U.S. Pat. No. 3,843,151 discloses the use of a particle screen device made of a wire mesh screen bag, or a porous pipe or cylinder, to prevent hot particles from contacting the inner surface of the airbag. Around the particle screen device, the '151 patent further contains a sound reducing bag made of wire mesh, fibered glass, asbestos, nylon, or a plastic material. In combination, the particle screen device and sound reducing screen prevent hot particles from the gas generator from contacting the airbag and reduce the level of sound resulting from the rapid expansion of inflating gases.

U.S. Pat. No. 3,900,210 discloses an airbag system with an inner, porous bag made of a knit material such as nylon or polyester. The inner bag is disclosed to reduce the sound resulting from inflation of the airbag and absorb heat and smoke produced from the use of the inflatable gas system.

U.S. Pat. No. 5,172,933 discloses an airbag system having a U-shaped fabric sleeve with two open ends disposed in proximity to the gas supply means. The U-shaped sleeve, which may have apertures on its surface, provides for the lateral flow of a substantial quantity of gases into the surrounding airbag through the open ends.

SUMMARY OF THE INVENTION

It is an object of the present invention to overcome the foregoing and other difficulties encountered in the prior art.

Another object of the present invention is to provide an inflatable occupant restraint device that is less prone to failure due to the high temperatures of the inflating gases.

Another object of the present invention is to provide an inflatable occupant restraint device that optimizes the flow pattern of the inflating gases into the outer airbag.

To achieve the objects and in accordance with the invention, as embodied and broadly described herein, the invention relates to an inflatable occupant restraint device that has an inflator, an inner bag disposed around the inflator wherein the inner bag is made of a flexible material having at least one flow outlet formed by a seam in the flexible material, and an outer bag, disposed around the inner bag in a manner allowing the outer bag to be filled with gas produced by the inflator.

DETAILED DESCRIPTION OF THE INVENTION

Figure 1:
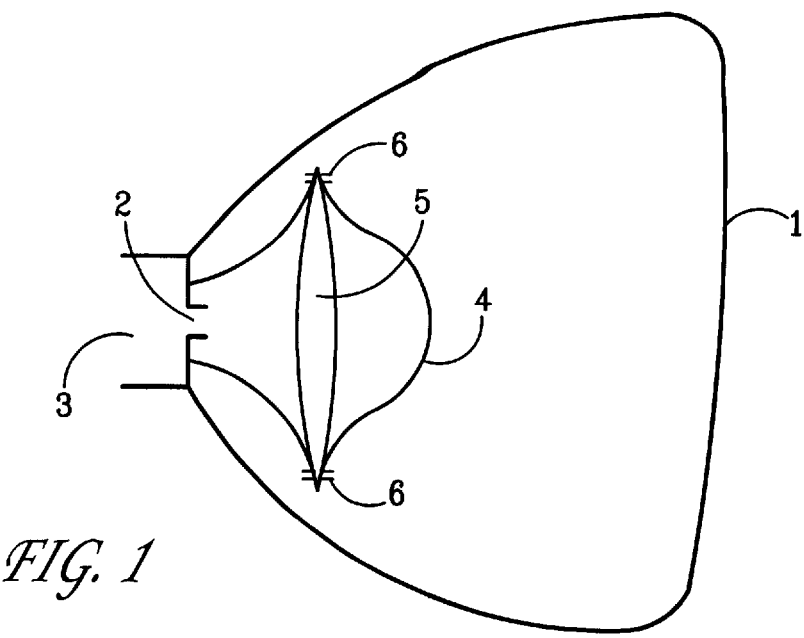
FIG. 1 shows a side view of an inflated airbag device used in accordance with the present invention.

As shown in FIG. 1, an inflatable occupant restraint device according to the invention comprises an outer, inflatable flexible material 1 in the shape of a bag. This "outer bag" surrounds an inner flexible bag 4 disposed around and in fluid communication with the outlet port or ports 2 of the inflator or gas supply means 3. As shown in the Figure, the inner bag 4 is in between the outer bag and the outlet port 2. The inner flexible bag has at least one gas flow outlet 5 formed by at least one seam 6 in the fabric.

The seam 6 may either continuously cover an extended length, or may be a "tack," i.e. a seam existing at shorter, discrete portions of the fabric. As used herein, the term "seam" embraces both continuous seams and tacks.

The inner bag 4 provides a combination of advantageous features. First, the inner bag acts as a heat shield, protecting the fabric of the outer bag 1 from hot gases generated by rapid combustion of the gas producing materials. The inner bag also acts as a heat shield by providing a space for the inflating gases to cool as they expand in the inner bag and subsequently inflate the outer bag. Expansion of the inflating gases in the inner bag allows the gases to cool before coming in direct contact with the outer bag. The inner bag may filter hot particulate matter produced by the inflator from contacting the inner surface of the outer bag 1. Also, the inner bag, because it completely surrounds the inflator, may protect the outer bag from direct contact with the hot surfaces of the inflator.

Generally, lightweight fabrics used for the outer bag are less resistant to the adverse effects of heat. Increasing protection of the outer bag of an airbag device according to the present invention may allow for effective and safe use of lightweight materials for the airbag fabric. Use of lightweight materials carries the additional benefits of reduced cost and more compact design of the device.

The inner bag 4 also provides the advantage of altering the flow path of inflating gases entering the outer bag. By selectively locating at least one of the seams to form at least one outlet in the inner bag, the flow of the inflating gases may be directed so that the outer bag achieves the desired inflated geometry as quickly as possible. In this way, one can employ the inner bag to control or manage the inflating gas flow by constructing the flow outlets with various seams in the inner bag at desired locations.

Furthermore, the gas flow can be made asymmetric by constricting the flow between the seams along a specific direction. Such an asymmetric gas flow to inflate the outer bag may be desired when the cover tear seam is asymmetric. An asymmetric gas flow may also position a locally inflated portion of the airbag early in deployment.

One may further fashion the pattern of seams used to form the gas outlet openings in the inner bag to redirect the inflating gases in a tortuous or convoluted flow path as they inflate the outer bag. Such a flow path may enhance the heat shielding properties of the inner bag. Specifically, a tortuous flow path may increase the likelihood that hot particles from the inflator contact the inner bag and are thus shielded from the outer bag. In this way, the inner bag may reduce the number of breaches in the airbag structure caused by hot particles penetrating the fabric. Similarly, a tortuous flow path may provide additional time for the inflating gases to cool before directly contacting the surfaces of the outer bag.

Figure 2:
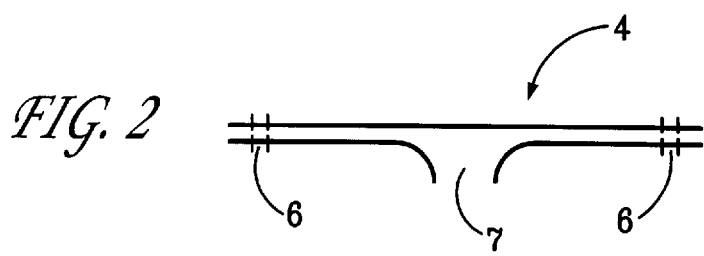
FIG. 2 shows a side view of an uninflated inner bag used in accordance with the present invention.
Figure 3:
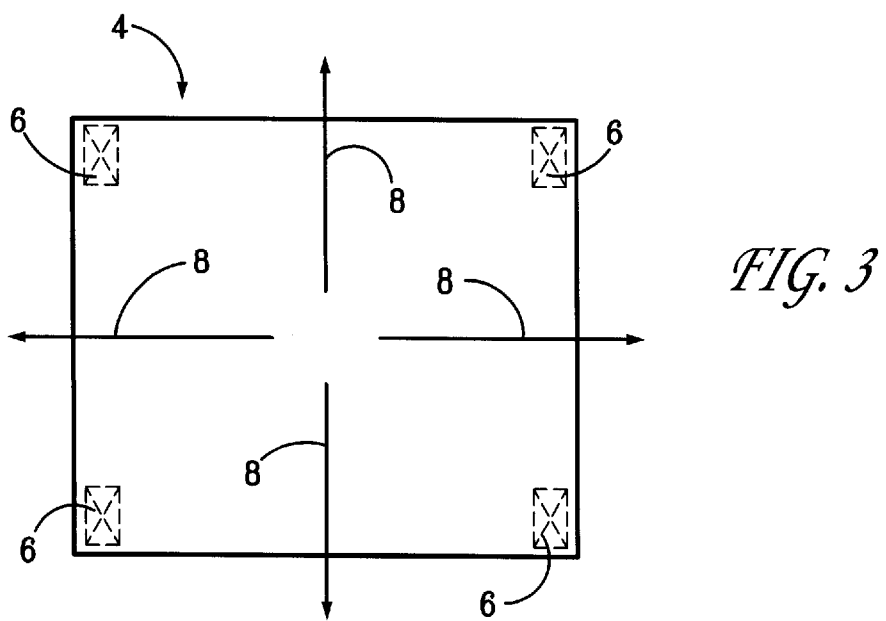
FIG. 3 shows a top view of an inner bag having a stitch pattern used in accordance with the present invention.
Figure 4:
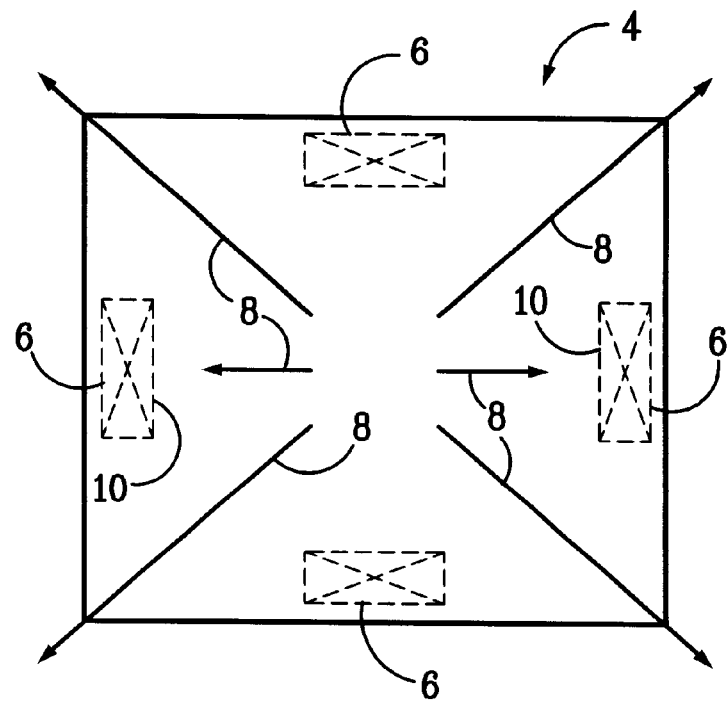
FIG. 4 shows a top view of another inner bag having a stitch pattern used in accordance with the present invention.
Figure 5:
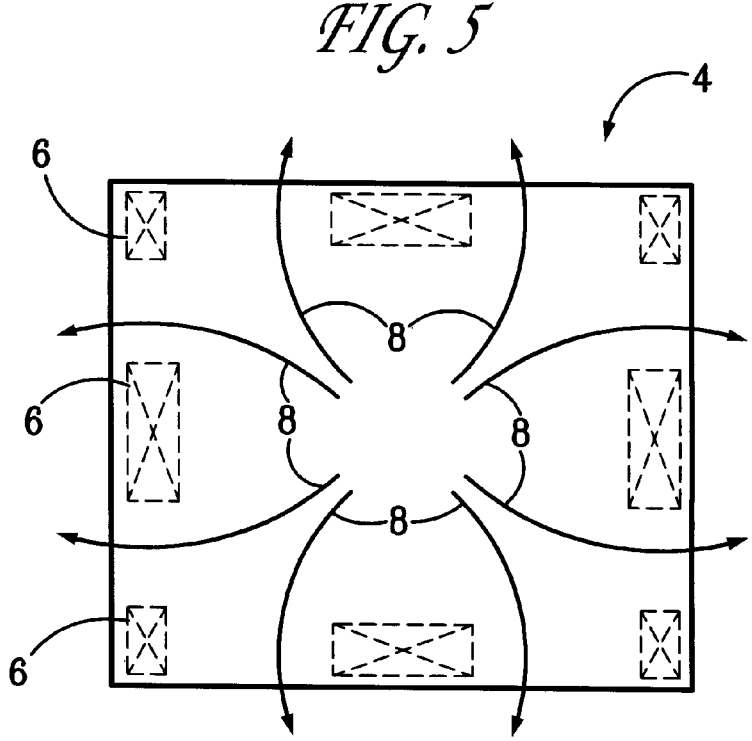
FIG. 5 shows a top view of another inner bag having a stitch pattern used in accordance with the present invention.

An example of a pattern of seams used to form flow outlets in the inner bag according to the invention can be seen in FIG. 2. FIG. 2 shows a side view of uninflated inner bag 4 having seams 6. Opening 7 is placed in communication with the outlet port or ports of the inflator (not shown). FIG. 3 shows the top view of the uninflated inner bag 4 shown in FIG. 2, having alternative locations for seams 6. The arrows 8 show the path of the inflating gases through the inner bag to the outer bag (not shown). FIGS. 4 and 5 show additional seam patterns for an inner bag in accordance with the present invention.

Figure 6:
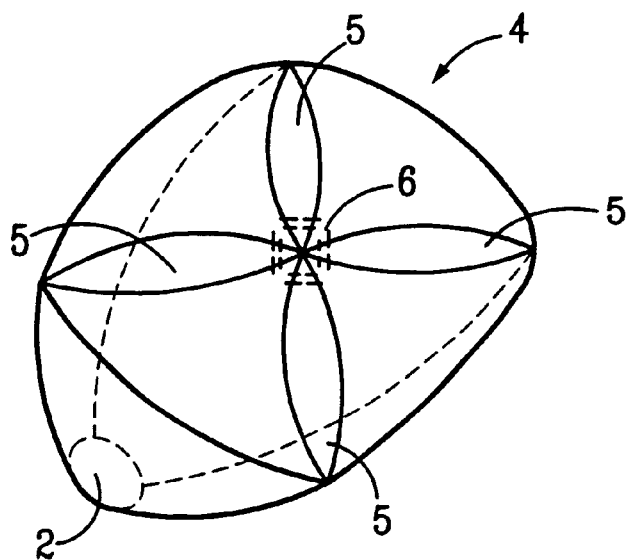
FIG. 6 shows a top oblique view of an inflated inner bag used in accordance with the present invention.

FIG. 6 shows yet another view (top oblique) of an inflated inner bag 4 of an airbag device in accordance with an embodiment of the present invention. Seamed sections 6 provide gas outlet openings 5, through which inflating gases entering the inner bag via opening 2 may pass to the outer bag (not shown).

As evidenced by the several figures disclosed herein, the seams and gas outlet openings may be arranged in any desired pattern, to effect the desired pattern of gas flow. For example, a fabric having an original square pattern, shown in FIG. 7, may be folded along lines 20 to form four flaps 26, which in this embodiment, are substantially triangular in shape. The bottom view of the folded fabric is shown in FIG. 8, with lines 22 representing the region where edges of the triangular flaps 26 meet to form an openings, and area 24 representing the region where the inner bag is attached to the inflator. Fold patterns such as those disclosed in U.S. Pat. No. 5,482,317, the entire contents of which are incorporated herein by reference, may also be used to form an inner bag in accordance with the present invention.

The flaps 26 may be joined together with seams adjacent to area 24. However, seams in this area are not necessary, as an attachment member may be sufficient to secure the flaps 26 to the inflator. Elimination of seams in this area provides a more uniform thickness of fabric, and may allow the attachment ring to more uniformly secure the flaps to the assembly.

An attachment member used in conjunction with the invention may be a stiff annular ring, as taught for example in U.S. application Ser. No. 08/579,827, filed Dec. 28, 1995, the entire contents of which are incorporated herein by reference. For example, the annular ring may have at least one groove in its surface, for receiving a seam or gather extending from the surface of the inner bag. Other examples of attachment members may be found in U.S. Pat. No. 5,195,774, the entire contents of which are also incorporated herein by reference.

Figure 9:
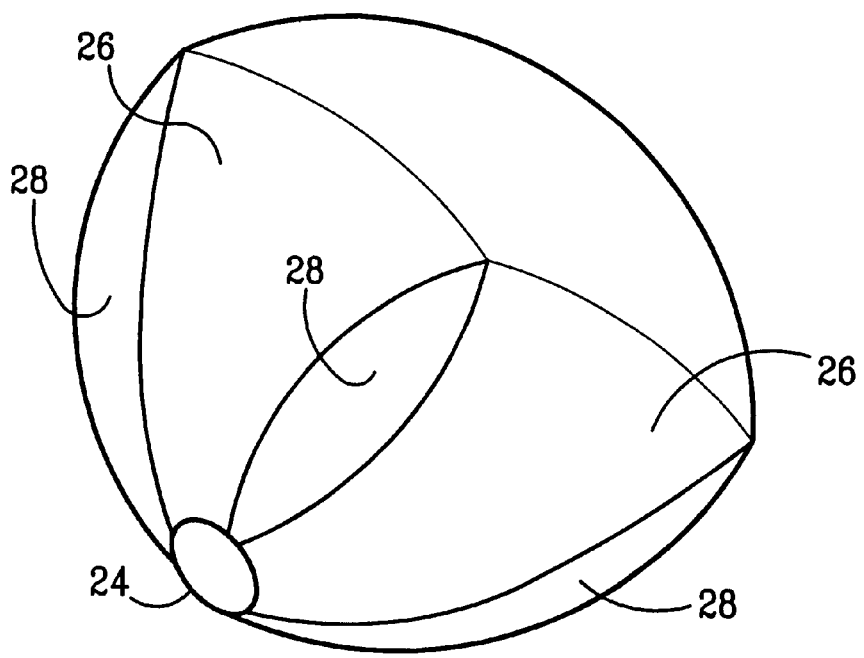
FIG. 9 shows a top oblique view of an inflated inner bag with openings lateral to the gas inflator means.

A top oblique view of an inner bag after inflation is shown in FIG. 9. Flaps 26 are attached to the inflator at area 24, to form openings 28 when the inner bag is inflated.

While FIGS. 6 through 9 show inner bags constructed by folding flaps of a square sheet inward, other equivalent shapes are embraced by the invention. For example, a fabric originally having an original triangular pattern may be folded three times to form three triangular flaps. In another embodiment, a fabric may be cut to allow for more than four substantially triangular portions folded over arced lines. The original shape of the fabric of this embodiment, before folding, may resemble a star.

Figure 7:
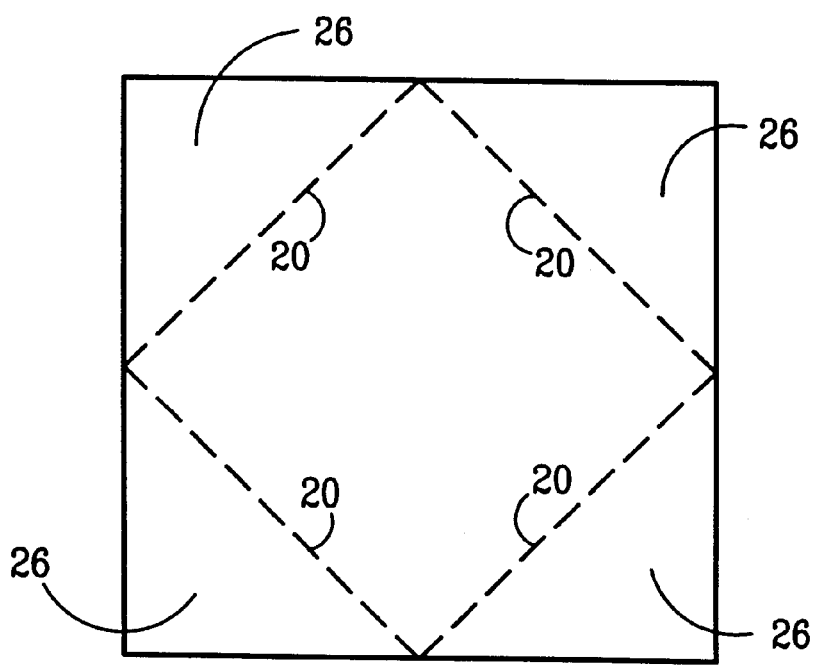
FIG. 7 shows a top view of a fabric having a square shape for an inner bag.
Figure 8:
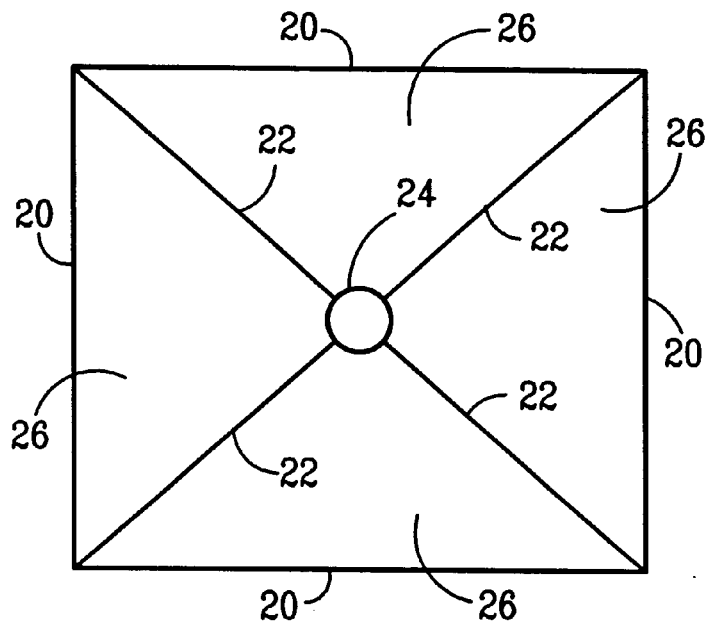
FIG. 8 shows a bottom view of a square fabric having been folded to form an inner bag.

An inner bag having gas outlet openings lateral to the inflator, as shown in FIGS. 7 through 9, will redirect the inflating gas flow into a radial pattern as it moves through the inner bag and into the outer bag during airbag deployment. Inner bags having lateral openings may be particularly effective for airbag assemblies where the inflator gas port or ports are in a substantially vertical position. The gas flow patterns resulting from embodiments of the invention may thus be optimized with respect to magnitude, direction, and speed of gas flow, to control the manner in which the outer airbag is inflated.

The seams of the inner bag may be formed by stitching, melt seaming, gluing with an adhesive, any other conventional means of attaching fabrics known in the art, and combinations of these methods. A preferred seam of the present invention is formed by stitching. Any type of stitching may be used in accordance with the invention, including straight or zig-zag locking stitches, chain stitches, and serging stitches. Patterned stitches such as a box, or box-x stitch my also be used.

Whatever means is used to form the seams of the inner bag, the strength of the seam may be controlled to achieve the desired effect. For example, the seams may be formed to withstand the maximum impulse load of the inflating gases during deployment without rupturing. One may vary the seam type, thread type and size, the stitches per inch (SPI), and the tension of the stitches.

Thread types usable in conjunction with the invention include waxed or unwaxed nylon, polyester, Kevlar, Spectra, and cotton, with nylon being the most preferred. The thread may have a size between an "E" and "3-cord, including "F" and "FF," based on military specifications. The most preferred thread size is "FF." The number of stitches per inch used in the inner bag may range from about 2 to about 18. The range of 6 to 8 is preferred for the inner bag stitches.

A preferred embodiment of the invention, however, embraces the use of tear stitching. As used herein, tear stitching refers to sacrificial stitching that ruptures when contacted with a predetermined impulse load. The tear stitching may be positioned between the inflator and final ring of box-x stitches. As the tear stitching ruptures, it absorbs energy from the expanding gases and decreases stress on the box-x stitch. Tear stitches may have a less dense stitch pattern, i.e. a lower number of stitches per inch. A typical SPI range used for tear stitching in the present invention includes a range of about 2 to about 8 SPI, but the a variable SPI may also be used. Using a variable SPI, the SPI increases as the stitching approaches a portion of the seam where rupturing of the stitch is not desired.

Figure 10:
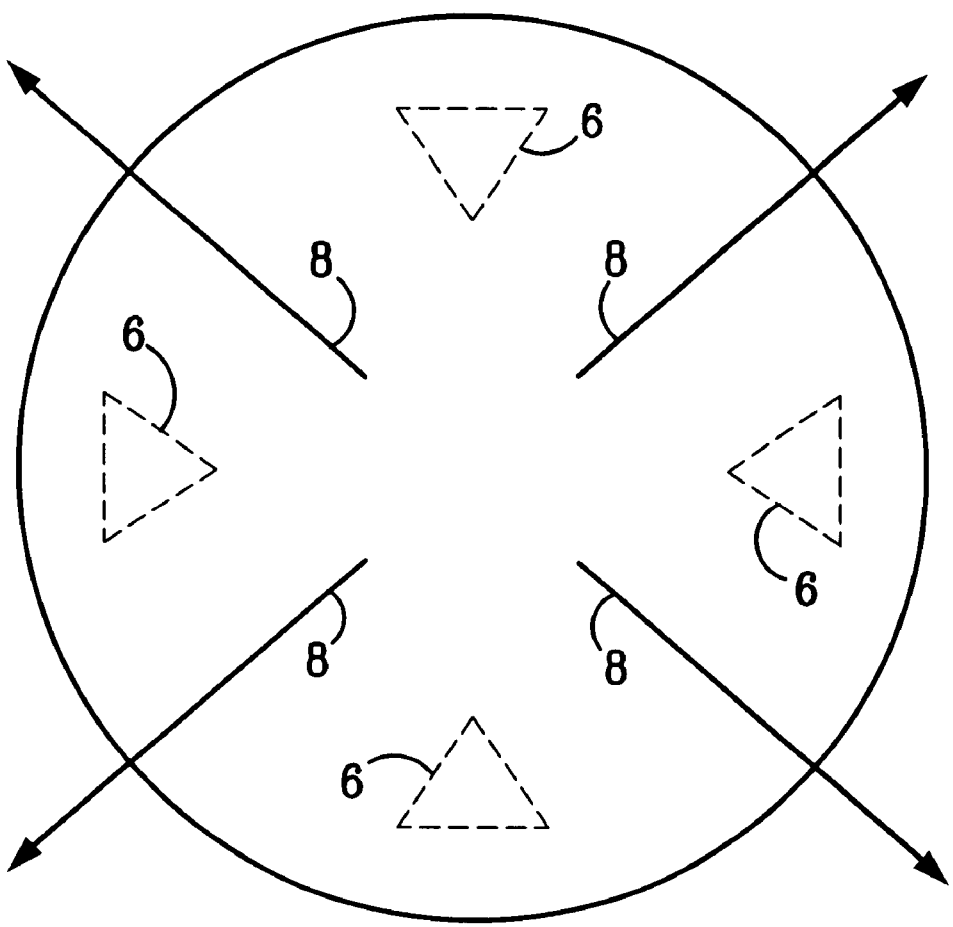
FIG. 10 shows a top view of another inner bag having a stitch pattern used in accordance with the present invention.

A preferred seam configuration embraced by the invention includes the use of tacks formed as wedges, as shown in FIG. 10. Typically, the heat shield enclosure is attached to the outer airbag at the "throat," i.e. the point of attachment to the inflator (not shown). When a box-x seam pattern, shown for example in FIG. 4, is used, the flow of inflating gases 8 runs into a flat line 10 of the box-x stitch at a substantially perpendicular angle. This may create a high drag and consequently tension on the outer airbag at the attachment throat region. This tension may contribute to failure of the airbag in the region of the throat.

In contrast, the flow of inflator gases 8 does not contact any line of a wedge seam configuration 6 at a substantially perpendicular angle. As a result, the wedge seam smoothly redirects the flow in a manner causing minimal drag and tension at the throat area.

The pattern of stitching and flow outlets may also be combined with a specific fold pattern in the inner bag to further achieve the desired gas flow into the outer bag. Fold patterns that may be used in conjunction with the present invention, for example, are taught in U.S. Pat. No. 5,482,317, the entire contents of which are incorporated herein by reference.

The inner bag of the present invention, may be constructed of woven fabrics, nonwoven fabrics, or films, all of which may be either porous or nonporous. The materials of construction include nylon, polyester, polyolefins, polyamides such as Kevlar®, or amides such as Nomex®. Further, the fabric for the inner bag may be coated with nylon or silicone compound containing coatings. These coatings may be applied to increase thickness, weight, and decrease permeability.

The outer bag may be of the type conventionally used in the art. The airbag device may be installed in any part of the vehicle effective for decreasing the danger to occupants in the event of a collision. Such locations may include the steering wheel, the dashboard, the door panels, or the seats.

The inflator used with the disclosed invention may include those using stored inert gas under pressure, those storing materials that produce the inflating gases as a result of burning, or combinations of either type. An example of a gas producing supply means may be found in U.S. Pat. No. 3,787,074, the entire contents of which are incorporated herein by reference. An example of an inflator that uses both a gas producing substance and a stored gas may be found in U.S. Pat. No. 3,674,059, the entire contents of which are incorporated herein by reference. The inflator may also have a baffle with apertures placed over the outlet port. The apertures of the baffle may be arranged to further control and manage the inflating gas flow as it enters the airbag. While use of such a baffle to further control the gas flow may constitute part of the invention, the invention also embraces an airbag device not having such a baffle.

What is claimed is:

1. An inflatable occupant restraint device comprising:
   an inflator;
   an inner bag disposed around the inflator wherein the inner bag is made of a flexible material having at least one flow outlet formed by a seaming the flexible material;
   an outer bag, disposed around the inner bag in a manner allowing the outer bag to be filled with gas produced by the inflator; and
   wherein the seam fastens two different pieces of the flexible material together.

2. The inflatable occupant restraint device of claim 1 wherein the seam is formed by stitching.

3. The inflatable occupant restraint device of claim 1, wherein the inner bag is comprised of a fabric selected from the group consisting of nylon, polyester, polyolefins, polyamides, and amides.

4. The inflatable occupant restraint device of claim 2, wherein the stitching has a number of stitches per square inch and thread size effective to provide a release in the stitching when affected by a predetermined force of gas from the inflator.

5. The inflatable occupant restraint device of claim 2, wherein the stitching comprises about 2 to about 8 stitches per inch.

6. The inflatable occupant restraint device of claim 1, wherein the seam or seams are arranged to create an asymmetric or tortuous flow path of gases emanating from the inflator.

7. The inflatable occupant restraint device of claim 1, further comprising a baffle placed between the inflator and the inner bag.

8. The inflatable occupant restraint device of claim 1, wherein the seams are formed substantially in the shape of a wedge.

9. The inflatable occupant restraint device of claim 1, wherein the flow outlet is adjacent to the inflator.

10. An inflatable occupant restraint device comprising:
    an inflator;
    an inner bag disposed around the inflator wherein the inner bag is made of a flexible material having at least one flow outlet formed by folding portions of the flexible material to an apex;
    an outer bag, disposed around the inner bag in a manner allowing the outer bag to be filled with gas produced by the inflator.

11. The inflatable occupant restraint device of claim 10, wherein the portions of the flexible material are secured at the apex with a stiff attachment member.

12. The inflatable occupant restraint device of claim 11, wherein the stiff attachment member is an annular ring.

13. The inflatable occupant restraint device of claim 10, wherein the portions of the flexible material are joined together by at least one seam.

14. The inflatable occupant restraint device of claim 12, wherein the annular ring has at least one groove for receiving a seam or gather extending from the surface of the flexible material.

15. The inflatable occupant restraint device of claim 10, wherein the flow outlet is arranged to create an asymmetric or tortuous flow path of gases emanating from the inflator.

16. The inflatable occupant restraint device of claim 10, wherein the folded portion of the flexible material is substantially triangular in shape.

17. The inflatable occupant restraint device of claim 10, wherein the apex of the inner bag is adjacent the inflator.

18. The inflatable occupant restraint device of claim 10, wherein the flow outlet is adjacent to the inflator.

* * * * *

UNITED STATES PATENT AND TRADEMARK OFFICE
CERTIFICATE OF CORRECTION

PATENT NO. : 6,283,499 B1  
DATED : September 4, 2001  
INVENTOR(S) : James M. Nelsen et al.

It is certified that error appears in the above-identified patent and that said Letters Patent is hereby corrected as shown below:

<u>Column 1,</u>  
Line 7, insert the following:  
This invention is a subject invention under Contract No. DE-AC04-94AL85000 between the Department of Energy and Sandia Corporation. The U.S. Government has rights in this invention under this contract.

Signed and Sealed this

Twenty-eighth Day of May, 2002

Attest:

*Attesting Officer*

JAMES E. ROGAN  
*Director of the United States Patent and Trademark Office*